(12) United States Patent
Jang et al.

(10) Patent No.: US 7,762,575 B2
(45) Date of Patent: Jul. 27, 2010

(54) SIDE AIRBAG FOR VEHICLE

(75) Inventors: Myung-ryun Jang, Suwon-si (KR); Byoung-sun Yoo, Seoul (KR); Tae-woo Kim, Wonju-si (KR); Dong-jun Lee, Wonju-si (KR); Eun-hwan Oh, Wonju-si (KR); Kyun-soon Choi, Jeonju-si (KR)

(73) Assignee: Autoliv Development AB, Vargarda (SE)

( * ) Notice: Subject to any disclaimer, the term of this patent is extended or adjusted under 35 U.S.C. 154(b) by 289 days.

(21) Appl. No.: 11/789,110

(22) Filed: Apr. 23, 2007

(65) Prior Publication Data
US 2007/0252366 A1   Nov. 1, 2007

(30) Foreign Application Priority Data

| Apr. 24, 2006 | (KR) | ...................... | 10-2006-0036746 |
| Apr. 24, 2006 | (KR) | ...................... | 10-2006-0036749 |
| Apr. 24, 2006 | (KR) | ...................... | 10-2006-0036752 |

(51) Int. Cl.
*B60R 21/233* (2006.01)
*B60R 21/213* (2006.01)

(52) U.S. Cl. .................. 280/729; 280/730.2; 280/743.1
(58) Field of Classification Search ................. 280/729, 280/730.2, 743.1
See application file for complete search history.

(56) References Cited

U.S. PATENT DOCUMENTS

| 6,010,149 | A * | 1/2000 | Riedel et al. ............. 280/730.2 |
| 6,244,619 | B1 * | 6/2001 | Satzger .................... 280/730.2 |
| 6,394,487 | B1 | 5/2002 | Heudorfer |
| 6,450,527 | B2 * | 9/2002 | Kobayashi et al. .......... 280/729 |
| 6,616,179 | B2 | 9/2003 | Tanase |
| 6,811,184 | B2 | 11/2004 | Ikeda |
| 6,843,502 | B2 * | 1/2005 | Aoki et al. ............... 280/730.2 |
| 7,059,630 | B2 * | 6/2006 | Maertens et al. .......... 280/730.2 |
| 2001/0026062 | A1 | 10/2001 | Kosugi et al. |

(Continued)

FOREIGN PATENT DOCUMENTS

DE        10109501 A1    10/2001

(Continued)

*Primary Examiner*—Eric Culbreth
*Assistant Examiner*—George D. Spisich
(74) *Attorney, Agent, or Firm*—Brinks Hofer Gilson & Lione

(57) ABSTRACT

Provided is a side airbag installed at a roof rail over a driver seat and a rear seat, which includes: a driver seat side airbag having a plurality of division chambers divided by chamber walls projecting therebetween, the chamber walls being curved in a direction opposite to a flow direction of a gas injected from an inflator, and a rear seat side airbag having a plurality of division chambers divided by chamber walls projecting therebetween, the chamber walls of the rear seat side airbag being curved in a direction opposite to the chamber walls of the driver seat side airbag.

Therefore, it is possible to protect a driver and a passenger on the rear seat, when the side airbag is deployed, by aligning an inlet of the driver seat side airbag disposed at the driver seat to a flow direction of the gas to rapidly deploy the side airbag. In addition, it is possible to safely protect the head of a driver or a passenger by first deploying a portion of the side airbag at which the driver or the passenger is positioned.

7 Claims, 6 Drawing Sheets

U.S. PATENT DOCUMENTS

| | | | |
|---|---|---|---|
| 2001/0035633 A1* | 11/2001 | Kobayashi et al. | 280/730.1 |
| 2002/0153713 A1* | 10/2002 | Fischer | 280/730.2 |
| 2003/0111829 A1* | 6/2003 | Tesch | 280/730.2 |
| 2003/0178820 A1* | 9/2003 | Green et al. | 280/730.2 |
| 2004/0212179 A1* | 10/2004 | Aoki et al. | 280/730.2 |
| 2005/0212270 A1 | 9/2005 | Wipasuramonton | |
| 2005/0248134 A1* | 11/2005 | Heigl | 280/730.2 |
| 2005/0269806 A1* | 12/2005 | Huber et al. | 280/730.2 |
| 2005/0275200 A1* | 12/2005 | Noguchi et al. | 280/730.2 |
| 2006/0012156 A1 | 1/2006 | Boxey | |
| 2006/0017267 A1* | 1/2006 | Fink | 280/730.2 |
| 2006/0071460 A1* | 4/2006 | Goto | 280/730.2 |
| 2006/0097491 A1* | 5/2006 | Saberan et al. | 280/730.1 |
| 2007/0164543 A1 | 7/2007 | Fukuda | |

FOREIGN PATENT DOCUMENTS

| | | |
|---|---|---|
| JP | 2003320920 A | 11/2003 |

* cited by examiner

SIDE AIRBAG FOR VEHICLE

CROSS-REFERENCE TO RELATED APPLICATION

This application claims the benefit of Korean Patent Application No. 2006-036746, filed Apr. 24, 2006, No. 2006-036749, filed Apr. 24, 2006, and No. 2006-036752, filed Apr. 24, 2006, the disclosure of which is hereby incorporated herein by reference in its entirety.

BACKGROUND OF THE INVENTION

1. Field of the invention

The present invention relates to a side airbag for a vehicle, and more particularly, to a side airbag for a vehicle installed at a side of a driver or a passenger to protect the driver or passenger when a side collision of a vehicle occurs, together with an airbag installed in front of a driver seat or a passenger seat.

2. Description of the Prior Art

As is well known, an airbag is installed in a vehicle to lessen impact applied to a driver or a passenger when a vehicle collision occurs, together with a safety belt, thereby protecting the driver or passenger.

In particular, the airbag is installed in front of a driver seat or a passenger seat to protect a driver or a passenger. When a vehicle collides with another object or abruptly stops, the airbag is inflated to prevent the driver or passenger from being inclined and directly collided with, for example, a steering wheel or an instrument panel, thereby absorbing impact applied to the driver or passenger.

The airbag is operated by a collision detection sensor and an electronic control unit (ECU) when a vehicle collision occurs. When the collision occurs, the collision detection sensor detects the collision to transmit a collision signal to the ECU, and the ECU determines operation of the airbag depending on the magnitude of the collision to operate an inflator, thereby deploying the airbag.

At this time, the inflator receives an operation signal form the ECU to operate a heater to ignite gunpowder. As a result, a gas generating agent is combusted to instantly generate a large amount of expansion gas to inject the expansion gas into the airbag, thereby expanding the airbag.

Meanwhile, in recent times, in order to protect a driver or a passenger even when a side collision of a vehicle occurs, a side airbag has been installed inside a door to protect the driver or passenger.

The side airbag is installed at a roof rail over a front seat or a rear seat to protect the driver or passenger by operating the inflator and deploying the side airbag when the side collision of a vehicle occurs.

Various side airbags have been developed, and a typical structure is shown in FIG. 1.

As shown in FIG. 1, a side airbag for a vehicle includes a chest bag 102 and a head bag 101. The chest bag 102 includes a mounting part 104 having a neck shape formed at its rear side, and a lower part 106 integrally formed with the mounting part 104.

In addition, the side airbag has a substantially symmetrical shape with respect to a tether 103. The tether 103 is disposed between the chest bag 102 and the head bag 101. A vent hole is formed far away from the mounting part 104, the head bag 101 extends from the chest bag 102 in a substantially symmetrical manner, and a pulling plate 105 is disposed between the chest bag 102 and the head bag 101.

The side airbag has an advantage of reducing vibration when the airbag is deployed. However, since the side airbag is separately installed at a front seat or a rear seat, much time for installation of the side airbag is consumed and a large number of processes are required, thereby decreasing working performance.

In order to solve the problem, a side airbag shown in FIG. 2 has been proposed.

As shown in FIG. 2, a side airbag for a vehicle includes an airbag 200 installed in a headlining of a roof side panel 100, and an inflator 300 installed at one side of the airbag 200 and accommodating a gas generating agent therein to deploy the airbag when a side collision occurs.

The side airbag has a guide member 220 having one end connected to the airbag 200 and the other end pivotally installed at the roof side panel 100.

The above side airbag has an advantage of covering a front seat and a rear seat using a single airbag. However, since the airbag cushion is deployed in a direction perpendicular to a flow direction of a gas generated from an inflator, it is difficult to rapidly protect a driver or a passenger.

In addition, the side airbag deforms a front pillar panel assembly of a roof rail, in particular, a portion between a front wind glass and a front door glass to deteriorate an appearance of the vehicle. That is, the gas inflates from the inflator with a high pressure to instantly deploy the airbag to apply impact to the roof rail, thereby deforming the roof rail.

Further, since it is difficult to gradually adjust an expansion pressure of the side airbag depending on deployment circumstance of the side airbag, the side airbag may apply a strong impact to a driver or a passenger to possibly make the driver or passenger collide with another part of the vehicle, thereby causing damage due to the airbag.

SUMMARY OF THE INVENTION

An aspect of the present invention is to provide a side airbag for a vehicle capable of more rapidly protecting a driver or a passenger when a side collision of a vehicle occurs.

Another aspect of the present invention is to provide a side airbag for a vehicle capable of deploying the side airbag without damage to a roof rail when the airbag is deployed.

Still another aspect of the present invention is to provide a side airbag for a vehicle capable of surely protecting a head of a driver or a passenger by adjusting an expansion pressure of the airbag when the airbag is deployed.

An embodiment of the invention provides a side airbag installed at a roof rail over a driver seat and a rear seat, which includes: a driver seat side airbag having a plurality of division chambers divided by chamber walls projecting therebetween, the chamber walls being curved in a direction opposite to a flow direction of a gas injected from an inflator, and a rear seat side airbag having a plurality of division chambers divided by chamber walls projecting therebetween, the chamber walls of the rear seat side airbag being curved in a direction opposite to the chamber walls of the driver seat side airbag.

Here, a partition wall may be formed between the driver seat side airbag and the rear seat side airbag, and the partition wall may have a larger width than the chamber walls and a triangular shape.

In addition, the chamber, among the chambers of the driver seat side airbag, farther away from the inflator may have a larger inner space and a larger inlet than the chamber near the inflator.

Another embodiment of the invention provides a side airbag installed at a roof rail over a driver seat and a rear seat, which includes: a driver seat side airbag having a plurality of division chambers divided by chamber walls projecting therebetween, the chamber walls being curved in a flow direction of a gas injected from an inflator, and a rear seat side airbag having a plurality of division chambers divided by chamber walls projecting therebetween, the chamber walls of the rear seat side airbag being curved in the same direction as the chamber walls of the driver seat side airbag.

Here, the driver seat side airbag and the rear seat side airbag may be divided by a partition wall.

In addition, the chamber walls of the driver seat side airbag and the rear seat side airbag maybe curved in the same direction as a flow direction of an expansion gas.

Further, the driver seat side airbag may have a first chamber formed nearest a front pillar panel assembly, a downward chamber wall projecting downward from the airbag cushion over the first chamber, and upward chamber walls projecting upward from the airbag cushion. The downward chamber wall and the upward chamber walls may be curved in a direction opposite to each other.

Furthermore, the upward chamber walls of the driver seat side airbag may have different heights.

In addition, the respective chamber walls of the driver seat side airbag and the rear seat side airbag may have a larger height nearer the partition wall and a smaller height further from the partition wall.

Still another embodiment of the invention provides a side airbag installed at a roof rail over a driver seat and a rear seat, which includes: a driver seat side airbag having a plurality of division chambers divided by chamber walls projecting therebetween, the chamber walls being curved in a flow direction of an expansion gas injected from an inflator to form a first deployment part, a second deployment part, and a dead zone deployment part, which are sequentially formed at driver seat along backward direction, and a rear seat side airbag having a plurality of division chambers divided by chamber walls projecting therebetween, the chamber walls being curved in a flow direction of an expansion gas injected from an inflator to form a fourth deployment part, a fifth deployment part, and a sixth deployment part, which are sequentially formed at the rear seat along backward direction.

Here, the dead zone deployment part may have a vent hole formed by projecting and bending a sixth chamber wall adjacent to the fourth deployment part to be spaced apart from a fourth chamber wall so that the expansion gas is slowly introduced through the vent hole.

Here, the first deployment part may include three chambers and two chamber walls.

In addition, a seventh chamber wall may project upward between the fourth deployment part and the fifth deployment part to be bent toward the fourth deployment part to form a smaller inlet of the fourth deployment part than a width thereof.

Further, a tenth deployment part may project upward between the fifth deployment part and the sixth deployment part to be bent and form a smaller inlet of the fifth deployment part than a width thereof.

Furthermore, a partition part may be formed over the first deployment part to divide the expansion gas injected form the inflator into upper and lower streams.

In addition, each of the chamber walls may be formed by attaching two airbag cushions face to face along predetermined lines and have a curved pocket shape at each tip part.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, exemplary embodiments of the present invention will be described with reference to the accompanying drawings.

First Exemplary Embodiment

Figure 1:
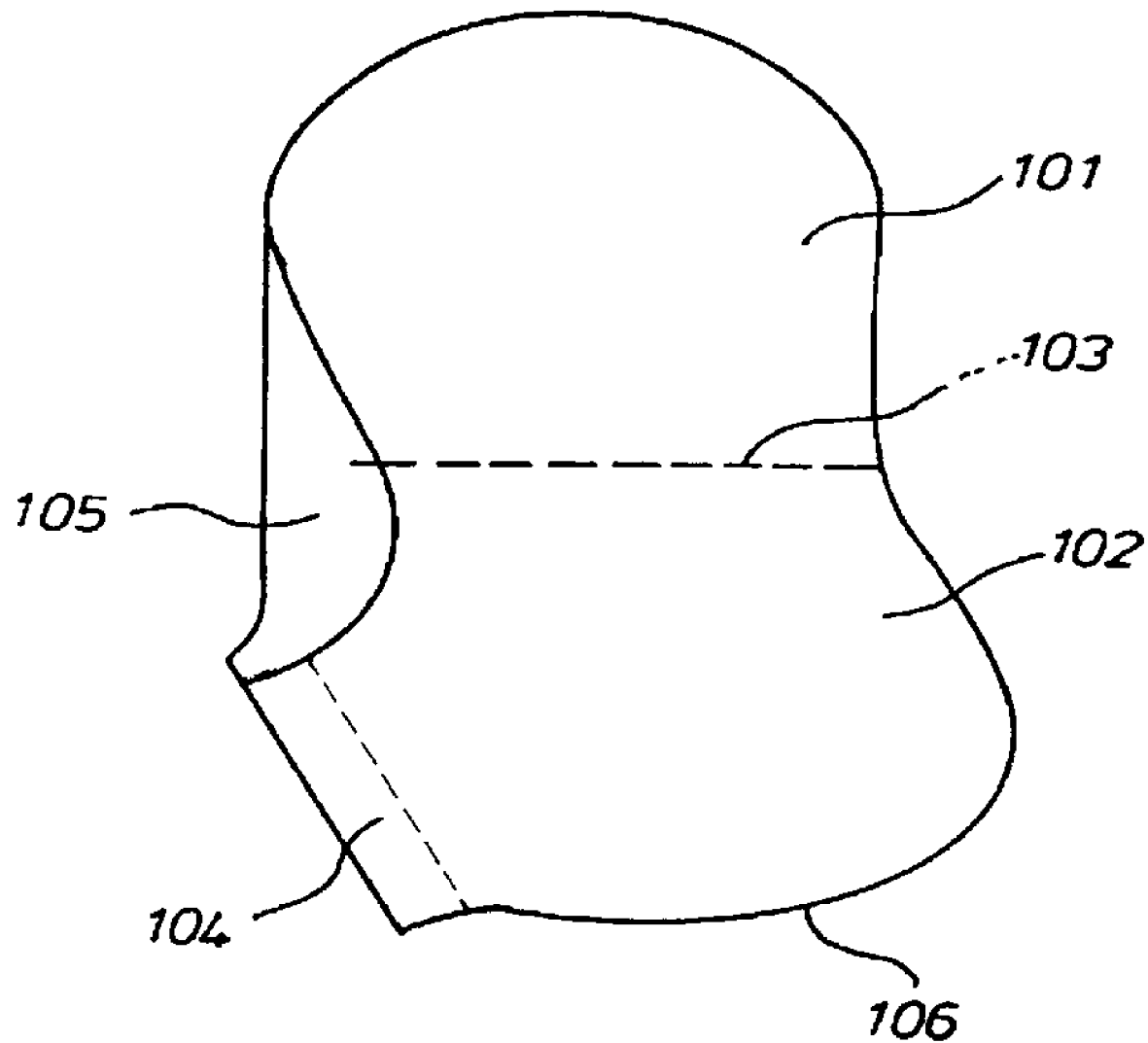
FIG. 1 is a front view of a conventional side airbag.
Figure 2:
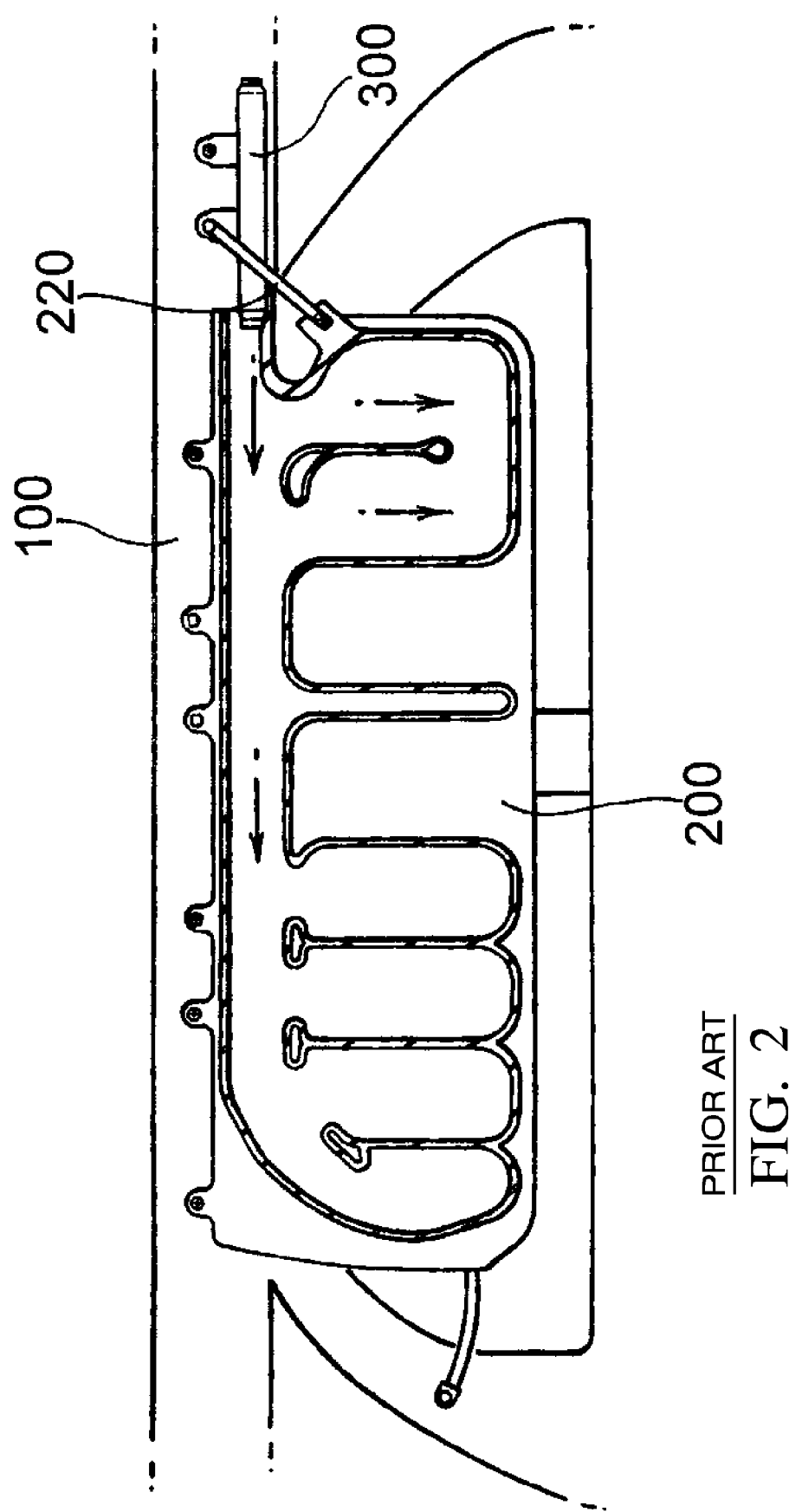
FIG. 2 is a cross-sectional view of a conventional side airbag.
Figure 3:
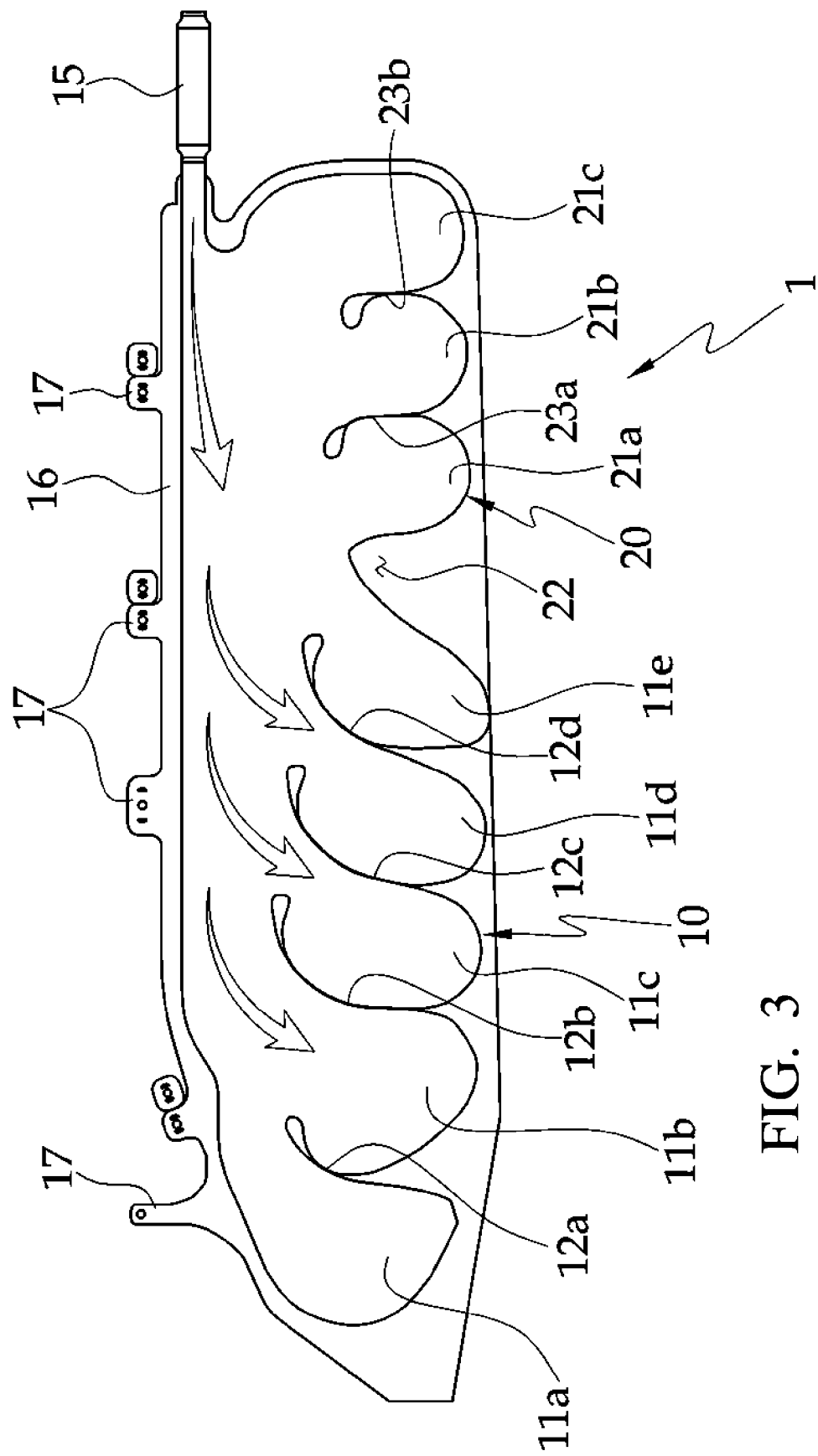
FIG. 3 is a cross-sectional view of a side airbag in accordance with a first exemplary embodiment of the present invention.

FIG. 3 is a cross-sectional view of a side airbag in accordance with a first exemplary embodiment of the present invention.

As shown, a side airbag 1 in accordance with a first exemplary embodiment of the present invention includes a driver seat side airbag 10 composed of a plurality of division chambers 11a-11e formed at a side surface of a driver seat, and a rear seat side airbag 20 composed of a plurality of division chambers 21a-21c formed at a side surface of a rear seat.

First, the division chambers 11a-11e of the driver seat side airbag 10 are comprised of a first chamber 11a, a second chamber 11b, a third chamber 11c, a fourth chamber 11d, and a fifth chamber 11e, which are sequentially formed at driver seat along backward direction.

In particular, chamber walls 12a-12d are configured to divide the chambers 11a-11e such that a gas generated from an inflator 15 is smoothly introduced into the chambers 11a-11e.

Specifically, the chamber walls 12a-12d project to a certain height from bottom surfaces of the chambers 11a-11e and between the chambers 11a-11e. The chamber walls 12a-12d have a round shape gradually curved toward the inflator 15. That is, the chamber walls 12a-12d are curved in a direction opposite to a flow direction of an expansion gas.

In addition, the first chamber 11a and the second chamber 11b further from the inflator 15 than the third chamber 11c to the fifth chamber 11e have larger inner space and inlet than those of the third chamber 11a to the fifth chamber 11e, thereby readily introducing a gas injected from the inflator 15 into the first and the second chamber 11a and 11b.

That is, when the gas generated from the inflator 15 is introduced into the airbag 1, the gas can be rapidly and uniformly introduced into the respective chambers 11a-11e formed at the driver seat side airbag 10.

Meanwhile, the rear seat side airbag 20 is comprised of a first chamber 21a, a second chamber 21b, and a third chamber 21c, and the rear seat side airbag 20 and the driver seat side airbag 10 have a substantially symmetrical shape with respect to a partition wall 22.

Specifically, chamber walls 23a and 23b are formed between the first chamber 21a, the second chamber 21b, and the third chamber 21c of the rear seat side airbag 20, similar to the chambers 11a-11e of the driver seat side airbag 10. Here, the chamber walls 23a and 23b are curved to have a shape substantially opposite to the chamber walls 11a-11e of the driver seat side airbag 10.

Therefore, the gas injected from the inflator 15 is introduced into the chambers 11a-11e of the driver seat side airbag 10 in a flow direction of the gas, and simultaneously, introduced into the chambers 21a to 21c of the rear seat side airbag 20.

In FIG. 3, the chamber walls have a structure formed by attaching two airbag cushions face to face along predetermined lines and have a curved pocket shape at each tip part, thereby slightly narrowing each inlet of the chambers.

In addition, a partition wall 22 having a substantially triangular cross-section is formed between the driver seat side airbag 10 and the rear seat side airbag 20. The partition wall 22 has a larger width than that of the respective chamber walls 12a-12d and 23a and 23b. Further, both sides of the partition wall 22 have substantially the same curved shapes as the chamber walls 12a-12d of the driver seat side airbag 10 and the chamber walls 23a and 23b of the rear seat side airbag 20.

Therefore, the gas injected from the inflator 15 is first filled in the driver seat side airbag 10 and then the rear seat side airbag 20, even though it is instantly performed. At this time, since the partition wall 22 helps to rapidly fill the gas into the rear seat side airbag 20, it is possible to rapidly maintain shapes and positions of the side airbags 10 and 20.

Meanwhile, the side airbag 1 is fixed to a bracket 17 fixed to a roof rail 16 by fixing means such as a clip and so on, and the inflator 15 is fixed to one upper side of the rear seat side airbag 20.

Therefore, when a collision strength signal detected by a collision detection sensor is transmitted to an ECU when a collision of a vehicle occurs, the ECU determines whether the airbag 1 should be operated or not.

Then, when the ECU transits an airbag operation signal to the inflator 15, the inflator 15 instantly ignites an ignition agent using an ignition circuit installed therein to explode gunpowder contained therein. As a result, a gas generating agent is combusted by heat generated due to explosion of the gunpowder, and an expansion gas is generated to be introduced into the side airbag 1.

Finally, the gas advances from the inflator 15 installed in the rear of the rear seat side airbag 20, and then diffuses in the entire airbag 1.

In particular, the diffusion of the gas is initiated at the driver seat side airbag 10 of the side airbag 1. At this time, since inlets of the chambers 11a-11e of the driver seat side airbag 10 are inclined in an injection direction of the expansion gas, the expansion gas can be rapidly filled in the chambers 11a-11e of the driver seat side airbag 10 after injected from the inflator 15.

Specifically, when a high pressure expansion gas is injected and then diffused therearound, the expansion gas is first introduced into the second, third and fourth chambers 11b, 11c and 11d of the driver seat side airbag 10, and then, introduced into the first and fifth chambers 11a and 11e, thereby deploying the driver seat side airbag 10.

Then, together with deployment of the driver seat side airbag 10, the first chamber 21a, the second chamber 21b and the third chamber 21c of the rear seat side airbag 20 are deployed.

The chambers 11a-11e and the chambers 21a-21c are instantly deployed. That is, the driver seat side airbag 10 and the rear seat side airbag 20 are substantially simultaneously deployed in visual.

As a result, the side airbag 1 installed at the roof rail 16 is entirely deployed to attenuate impact applied to a head part of a driver or a passenger on the driver seat or the passenger seat, thereby safely protecting the driver or passenger.

As described above, while the embodiment in accordance with the present invention has been described to have the five chambers 11a-11e of the driver seat side airbag 10, three or seven chambers may be used. Of course, the rear seat side airbag 20 may also have at least one chamber.

Second Exemplary Embodiment

Figure 4:
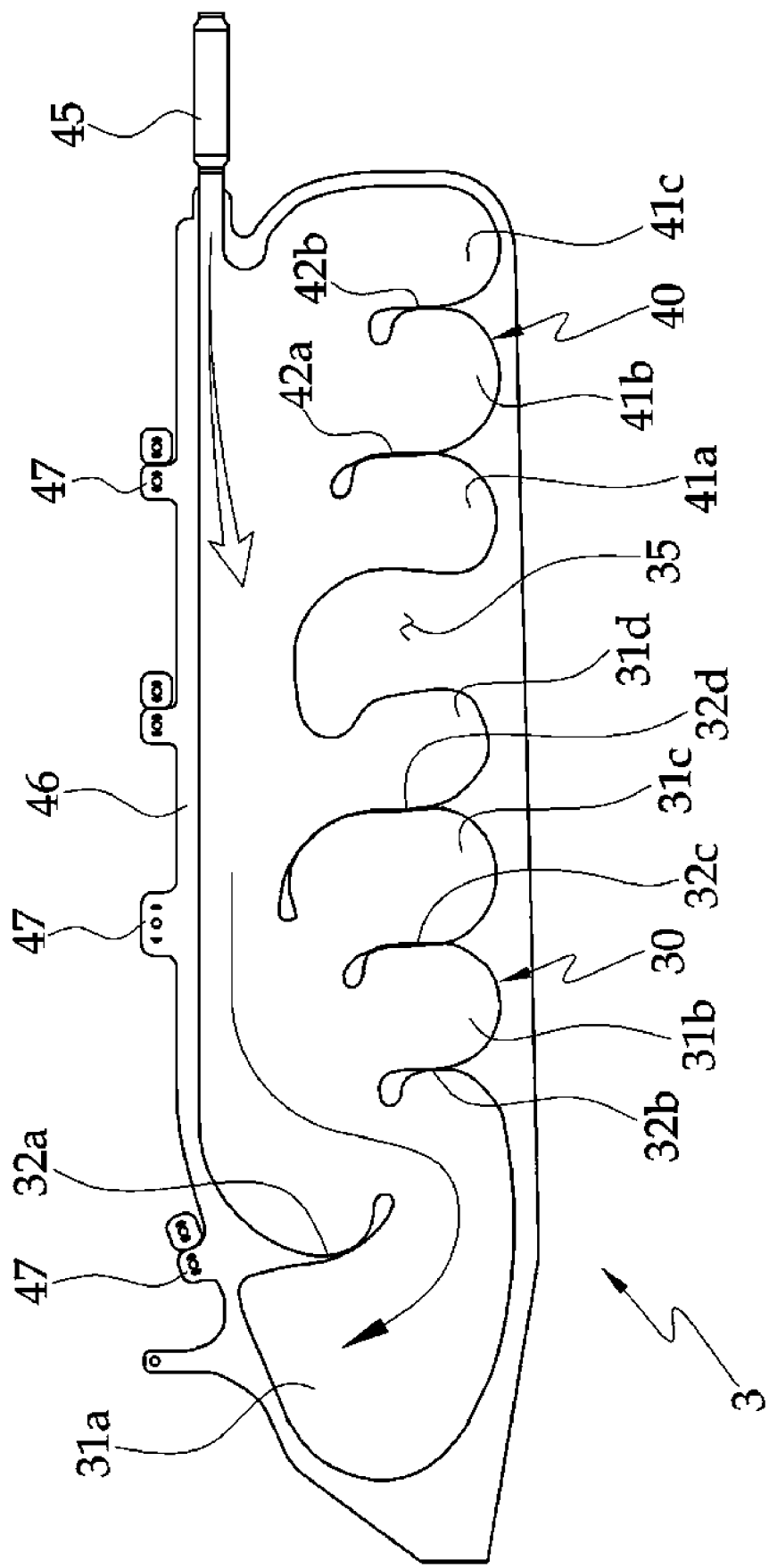
FIG. 4 is a cross-sectional view of a side airbag in accordance with a second exemplary embodiment of the present invention.

FIG. 4 is a cross-sectional view of a side airbag in accordance with a second exemplary embodiment of the present invention.

As shown in FIG. 4, a side airbag 3 for a vehicle in accordance with a second exemplary embodiment of the present invention includes a driver seat side airbag 30 disposed at a driver seat, and a rear seat side airbag 40 disposed at a rear seat.

First, the driver seat side airbag 30 is comprised of four division chambers, i.e., a first chamber 31a, a second chamber 31b, a third chamber 31c, and a fourth chamber 31d, which are sequentially disposed from a front pillar panel assembly.

The first chamber 31a is configured to have a larger space than other chambers 31b-31d, and a downward chamber wall 32a formed at an interface with the other chambers and inclined in a direction opposite to a flow direction of an expansion gas. Therefore, the expansion gas injected from an inflator 45 is blocked by the downward chamber wall 32a and primarily pressure dropped, and then, passes through an inlet of the first chamber 31a downward to rise therein. That is, the expansion gas from the inflator 45 is maintained in the first chamber 31a at a low pressure.

In addition, chamber walls 32b-32d project upward between the other chambers 31b-31d.

The chamber walls 32b, 32c and 32d have different heights. The first chamber wall 32b has a smaller height than the second chamber wall 32c, and the third chamber wall 32d has a larger height than the second chamber wall 32c.

The chamber walls 32b-32d having different heights are configured to form inlets of the chambers 31a-31d such that the expansion gas injected from the inflator 45 with a high pressure is first introduced into the first chamber 31a, rather than the other chambers 31b-31d. In addition, the chamber walls 32a-32d have round shapes curved in the same direction as a flow direction of the gas injected form the inflator 45 to maintain straightness of the injected gas.

In addition, a partition wall 35 is formed between the driver seat side airbag 30 and the rear seat side airbag 40 to have a width substantially equal to the width of each chamber 31b-31d. The rear seat side airbag 40 is comprised of a plurality of division chambers 41a, 41b and 41c.

First and second chamber walls 42a and 42b project upward between the chambers 41a, 41b and 41c, similar to the driver seat side airbag 30. However, the first chamber wall 42a has a larger height than the second chamber wall 42b.

In addition, the chamber walls 42a and 42b have curved pocket shapes at each tip part formed by attaching two airbag cushions face to face along predetermined lines so that inlets of the chambers 41a, 41b and 41c are formed narrow.

Meanwhile, the side airbag 3 is fixed to a bracket 47 of a roof rail 46 by fixing means such as a clip and so on, and the inflator 45 for injecting a gas is installed at one upper side of the rear seat side airbag 40.

Therefore, when a collision strength signal detected by a collision detection sensor is transmitted to an ECU when a collision of a vehicle occurs, the ECU determines whether the side airbag 3 should be operated or not.

Then, when the ECU transmits a signal for operating the side airbag 3 to the inflator 45, the inflator 45 instantly ignites an ignition agent using an ignition circuit installed therein to explode gunpowder contained therein. As a result, a gas generating agent is combusted by heat generated due to explosion of the gunpowder, and an expansion gas is generated to be introduced into the side airbag 3.

Finally, the gas flows from the inflator 45 installed in the rear of the rear seat side airbag 40 and then diffuses in the entire airbag 3, thereby deploying the side airbag 3.

Specifically, the driver seat side airbag 30 of the present invention is deployed by expansion of the chambers 31a-31d. The expansion gas injected from the inflator 45 with a high pressure passes the chamber walls 32b-32d, and 42a and 42b projecting upward in a curved manner and then is diffused, thereby being introduced into the chambers 31a-321d.

In particular, since the third chamber wall 32d of the driver seat side airbag 30 projects upward, an injection pressure of the expansion gas is primarily reduced, and then, the expansion gas continuously flows until blocked by the downward chamber wall 32a so that the pressure of the expansion gas is dropped to be introduced into the first chamber 31a to expand the first chamber 31a.

Together with introduction of the expansion gas having the dropped pressure into the first chamber 31a, the chambers 31b-31d of the driver seat side airbag 30 are expanded.

Specifically, together with introduction of the expansion gas into the first chamber 31a of the driver seat side airbag 30, the expansion gas blocked by the downward chamber wall 32a flows in an opposite direction. At this time, since the chamber walls 32b-32d of the driver seat side airbag 30 are curved in a direction opposite to a flow direction of the expansion gas to smoothly introduce the expansion gas into the chambers 31b and 31c.

Meanwhile, together with deployment of the driver seat side airbag 30, the rear seat side airbag 40 divided by the partition wall 35 is deployed. A portion of the expansion gas injected and diffused from the inflator 45 and the expansion gas counter-flowed after deployment in the driver seat side airbag 30 are introduced and expanded in the first chamber 41a, the second chamber 41b, and the third chamber 41c of the rear seat side airbag 40.

Since the chamber walls 42a and 42b of the rear seat side airbag 40 are curved in a flow direction of the counter-flowed expansion gas, it is possible to smoothly introduce the expansion gas into the chambers 41a, 41b and 41c of the rear seat side airbag 40.

As described above, the driver seat side airbag 30 decreases a pressure of the expansion gas introduced into the first chamber 31a, when the first chamber 31a is deployed, to reduce a pressure applied to the roof rail 46, i.e., the front pillar panel assembly, thereby preventing deformation of the roof rail 46.

Since the side airbag 3 is instantly deployed by the expansion gas injected form the inflator 45, it is possible to safely protect the side of a driver or a passenger when a collision of a vehicle occurs.

Third Exemplary Embodiment

Figure 5:
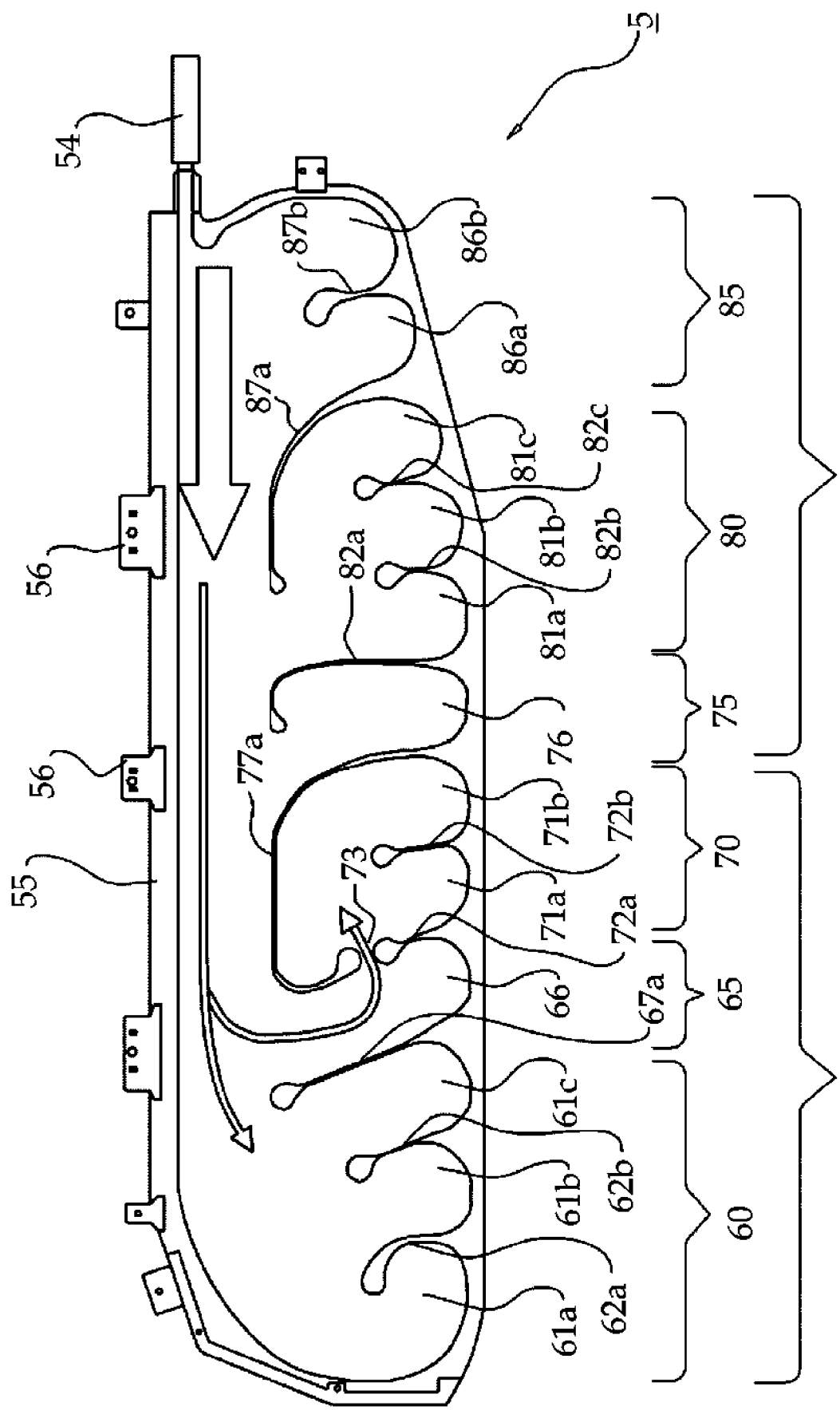
FIG. 5 is a cross-sectional view of a side airbag in accordance with a third exemplary embodiment of the present invention.

FIG. 5 is a cross-sectional view of a side airbag in accordance with a third exemplary embodiment of the present invention.

As shown, a side airbag 5 of the present invention includes a driver seat side airbag 52 comprised of a first deployment part 60, a second deployment part 65, and a dead zone deployment part 70, each of which has a plurality of division chambers, and a rear seat side airbag 53 comprised of a fourth deployment part 75, a fifth deployment part 80, and a sixth deployment part 85, each of which has a plurality of division chambers.

In addition, the first deployment part 60 of the driver seat side airbag 52 is comprised of three chambers 61a, 61b and 61c, and first and second chamber walls 62a and 62b projecting upward between the chambers 61a, 61b and 61c.

The chamber walls 62a and 62b have different heights. The first chamber wall 62a has an inwardly curved shape, and the second chamber wall 62b projects upward in a tilted manner.

In addition, the second deployment part 65 is formed of a single chamber, and the dead zone deployment part 70 is formed adjacent to the second deployment chamber 65. Further, a third chamber wall 67a is formed between the third chamber 61c of the first deployment part 60 and a fourth chamber 66 of the second deployment part 65, and the third chamber wall 67a is higher than the first and second chamber walls 62a and 62b.

Furthermore, the dead zone deployment part 70 is disposed over the head of a driver, and comprised of two chambers, i.e., a fifth chamber 71a and a sixth chamber 71b. A fourth chamber wall 72a is formed between the fourth chamber 66 and the fifth chamber 71a, and a fifth chamber wall 72b is formed between the fifth chamber 71a and the sixth chamber 71b.

In addition, the fourth deployment part 75 adjacent to the dead zone deployment part 70 is formed of a single chamber, i.e., a seventh chamber 76. A sixth chamber wall 77a is formed between the sixth chamber 71b and the seventh chamber 76. The sixth chamber wall 77a projects upward, and then, is curved to be disposed adjacent to the fourth chamber wall 72a That is, the fourth chamber wall 72a and the sixth chamber wall 77a form a vent hole 73 defined therebetween such that an expansion gas is introduced into the second deployment part 65 and then passed through the dead zone deployment part 70, thereby smoothly deploying the dead zone deployment part 70.

Further, since the chamber walls 62a, 62b, 67a, 72a, 72b and 77a have curved pocket shapes at each tip part formed by attaching two airbag cushions face to face along predetermined lines, inlets of the chambers 61a, 61b, 61c, 66, 71a, 71b and 76 are narrowed so that the expansion gas is somewhat slowly introduced into the chambers to deploy the driver seat side airbag.

Meanwhile, the rear seat side airbag 53 is disposed adjacent to a rear seat to protect a passenger on the rear seat, and comprised of a fourth deployment part 75 and a sixth deployment part 85. However, the rear seat side airbag 53 of the present invention is not limited thereto and may have various constitutions of the deployment parts.

The fifth deployment part 80 is comprised of three chambers, i.e., an eighth chamber 81a, a ninth chamber 81b, and a tenth chamber 81c. A seventh chamber wall 82a is formed between the seventh chamber 76 of the fourth deployment part 75 and the eighth chamber 81a of the fifth deployment part 80. The seventh chamber wall 82a projects upward and is bent toward the dead zone deployment part 70 at a predetermined height so that an inlet of the fourth deployment part 75 is formed narrow.

An eighth chamber wall 82b is formed between the eighth chamber 81a and the ninth chamber 81b, and a ninth chamber wall 82c is formed between the ninth chamber 81b and the tenth chamber 81c.

In addition, the sixth deployment part 85 is comprised of two chambers, i.e., an eleventh chamber 86a and a twelfth chamber 86b. A tenth chamber wall 87a is formed between the tenth chamber 81c and the eleventh chamber 86a of the fifth deployment part 80. The tenth chamber wall 87a is curved toward the fourth deployment part 75 to narrow an inlet of the fifth deployment part 80.

Further, an eleventh chamber wall 87b is formed between the eleventh chamber 86a and the twelfth chamber 86b.

The chamber walls 82a, 82b, 82c, 87a and 87b have curved pocket shapes at each tip part formed by attaching two airbag cushions face to face along predetermined lines to slightly narrow inlets of the fourth deployment part 75 and the fifth deployment part 80.

The side airbag 5 is fixed to a fixing bracket 5 of a roof rail 55 by a fixing clip and so on, and an inflator 54 is installed at one upper side of the side airbag 5 to inject an expansion gas to deploy the side airbag 5.

Therefore, when a collision strength signal detected by a collision detection sensor is transmitted to an ECU when a collision of a vehicle occurs, the ECU determines whether the side airbag 5 should be operated or not.

Then, when the ECU transmits a signal for operating the side airbag 5 to the inflator 54, the inflator 54 instantly ignites an ignition agent using an ignition circuit installed therein to explode gunpowder contained therein. As a result, a gas generating agent is combusted by heat generated due to explosion of the gunpowder, and an expansion gas is generated to be introduced into the side airbag 5.

Finally, the gas flows from the inflator 45 installed in the rear of the rear seat side airbag 53 and then diffuses in the entire airbag 5, thereby deploying the side airbag 5.

In particular, the side airbag 5 of the present invention includes the tenth chamber wall 87a, the seventh chamber wall 82a, and the sixth chamber wall 77a curved in an injection direction of the expansion gas injected form the inflator 54 installed at an upper part of the rear seat roof rail 55, thereby flowing the expansion gas in a straight direction.

Therefore, the expansion gas is first introduced into the chambers 61a, 61b and 61c of the first deployment part 60 to deploy the first deployment part 60, and simultaneously, the second deployment part 65 formed of the fourth chamber 66 is deployed. In addition, together with deployment of the second deployment part 65, the dead zone deployment part 70 starts to be deployed through the vent hole 73 between the fourth chamber wall 72a and the sixth chamber wall 77a However, since the expansion gas is introduced into the narrow vent hole 73 to slowly deploy the dead zone deployment part 70.

Simultaneously, the fourth deployment part 75 starts to be deployed. At this time, since the seventh chamber wall 82a is inclined toward the sixth chamber wall 77a, the fourth deployment part 75 is deployed after deployment of the second deployment part 65.

After deployment of the fourth deployment part 75, the fifth deployment part 80 and the sixth deployment part 85 are deployed, and then, deployment of the dead zone deployment part 70 adjacent to the second deployment part 65 is completed.

In particular, since a small amount of expansion gas is introduced into the dead zone deployment part 70 through the vent hole 73, the dead zone deployment part 70 is more slowly deployed than the other deployment parts 75, 80 and 85 so that the dead zone deployment part 70 for protecting the head of a driver is first deployed in an appropriate pressure state by the previously introduced expansion gas and then deployed by a certain volume by the expansion gas introduced through the vent hole 73 after deployment of the other deployment parts 60, 65, 70, 75, 80 and 85.

Finally, the dead zone deployment part 70 of the present invention is more slowly expanded than the other deployment parts 60, 65, 75, 80 and 85 to attenuate impact applied to the side of the driver, i.e., the head of the driver.

Fourth Exemplary Embodiment

Figure 6:
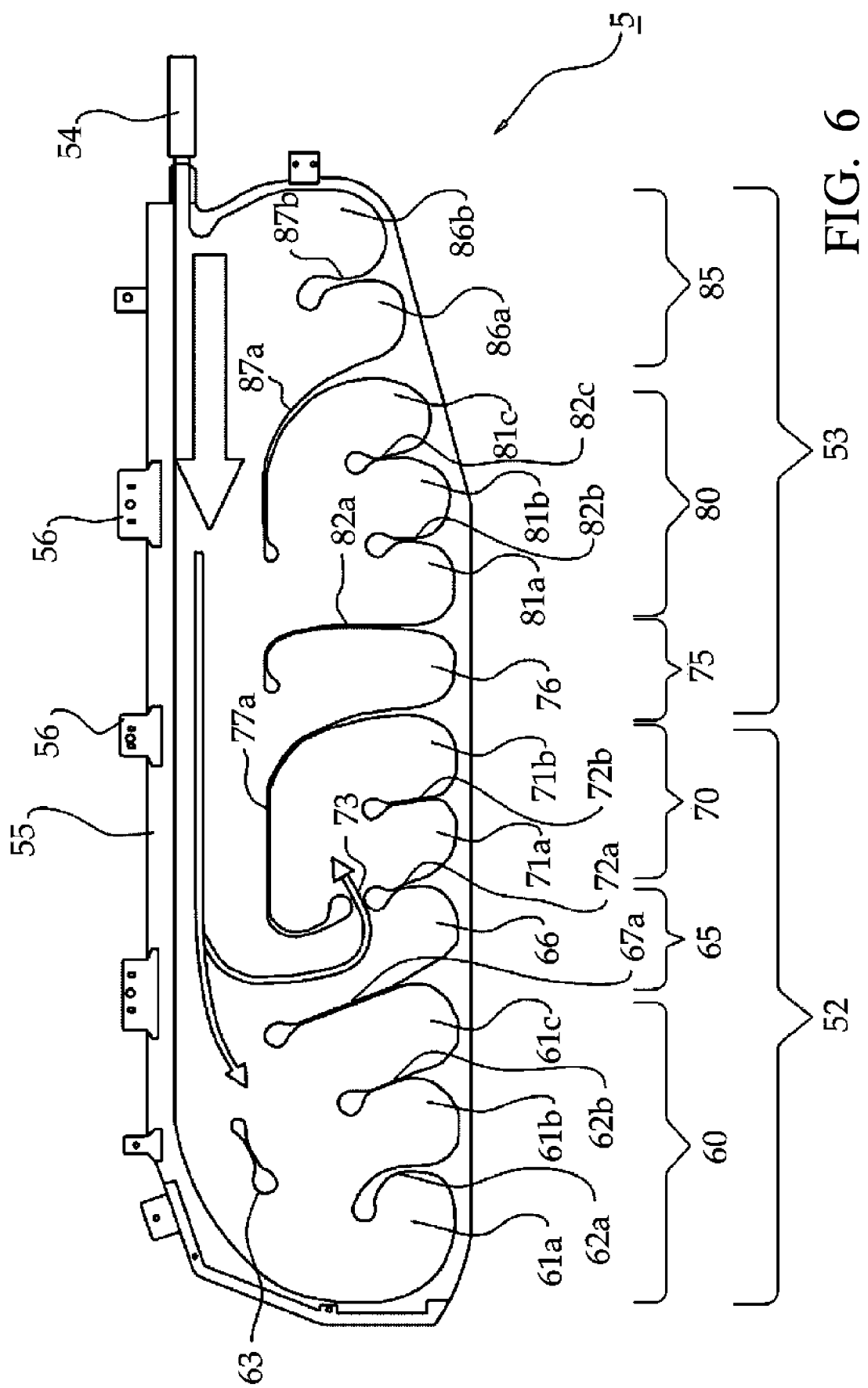
FIG. 6 is a cross-sectional view of a side airbag in accordance with a fourth exemplary embodiment of the present invention.

FIG. 6 is a cross-sectional view of a side airbag in accordance with a fourth exemplary embodiment of the present invention. A first deployment part 60 to a sixth deployment part 85 of the fourth embodiment are the same as the third embodiment, so their description will not be repeated.

The fourth embodiment of the present invention is characterized in that a partition part 63 is formed over the first deployment part 60.

Therefore, an expansion gas injected from an inflator 54 flows to the first deployment part 60 through a passage formed over the partition part 63 to rapidly deploy the first chamber 61a.

In addition, the expansion gas flows through a passage formed under the partition part 63 to deploy a second chamber 61b and a third chamber 61c of the first deployment part 60, thereby increasing the deployment speed of the first deployment part 60.

As can be seen from the foregoing, in accordance with a first exemplary embodiment of the present invention, it is possible to protect a driver and a passenger on a rear seat, when a side airbag is deployed, by aligning an inlet of a driver seat side airbag disposed at a driver seat to a flow direction of a gas to rapidly deploy the side airbag. In addition, it is possible to safely protect the head of a driver or a passenger by first deploying a portion of the side airbag at which the driver or the passenger is positioned.

Further, in accordance with a second exemplary embodiment of the present invention, it is possible to more safely protect the side of a passenger, when a side collision of a vehicle occurs, by dropping the pressure of an expansion gas injected from an inflator to expand a driver seat side airbag, and prevent deformation of a roof rail by attenuating impact applied to the roof rail.

Furthermore, in accordance with third and fourth exemplary embodiments of the present invention, it is possible to optimally protect a passenger by gradually adjusting an expansion pressure at each position depending on deployment of a side airbag. In particular, since a dead zone deployment part is more slowly expanded than the other deployment parts, it is possible to remarkably attenuate impact applied to the head of a driver after the side collision of a vehicle.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

What is claimed is:

1. A side airbag for a vehicle, comprising:
   a driver seat side airbag portion having a plurality of chambers defined by a plurality of chamber walls; and
   a rear seat side airbag portion having a plurality of chambers defined by a plurality of chamber walls, the chamber walls of the rear seat side airbag portion being curved in a first direction toward the driver seat side airbag portion and the chamber walls of the driver seat side airbag portion being curved in a second direction toward the rear seat side airbag portion, the first direction being opposite to the second direction,
   wherein a gas is injected from the rear seat side airbag portion toward the driver seat side airbag portion by an inflator disposed at an upper end of the rear seat side airbag portion, and
   wherein the plurality of chamber walls in the driver seat side airbag portion and the rear seat side airbag portion are arranged such that a height of each chamber wall in the plurality of chamber walls of the driver seat side airbag portion and the rear seat side airbag portion increases with increasing distance away from the inflator, and the height of an additional chamber wall in the driver seat side airbag portion farthest away from the inflator does not further increase as do the other respective plurality of chamber walls in the driver seat side airbag portion and the rear seat side airbag portion.

2. The side airbag according to claim 1, wherein a partition wall is located between the driver seat side airbag portion and the rear seat side airbag portion, and the partition wall has a larger width than the chamber walls and a triangular shape.

3. The side airbag according to claim 1, wherein each of the chamber walls is formed by attaching two panels of the side airbag face-to-face along predetermined lines and have a curved pocket shape at each top part of the chamber walls.

4. The side airbag according to claim 1, wherein a partition wall is located between the driver seat side airbag portion and the rear seat side airbag portion, and all of the chamber walls of the driver seat side airbag portion extend above a top of the partition wall.

5. The side airbag according to claim 4, wherein a fluid passage is disposed between the top of the partition wall and an upper edge of the side airbag.

6. The side airbag according to claim 4, wherein a fluid passage is disposed between a top of all of the chamber walls of the driver seat side airbag portion and the upper edge of the side airbag, wherein the fluid passage disposed between the top of all of the chamber walls of the driver seat side airbag portion and the upper edge of the side airbag is smaller than the fluid passage disposed between the top of the partition wall and the upper edge of the side airbag.

7. The side airbag according to claim 6, wherein a fluid passage is disposed between a top of at least one of the chamber walls of the rear seat side airbag portion and the upper edge of the side airbag, wherein the fluid passage disposed between the top of the at least one of the chamber walls of the rear seat side airbag portion and the upper edge of the side airbag is smaller than the fluid passage disposed between the top of the partition wall and the upper edge of the side airbag.

* * * * *